UNITED STATES PATENT OFFICE.

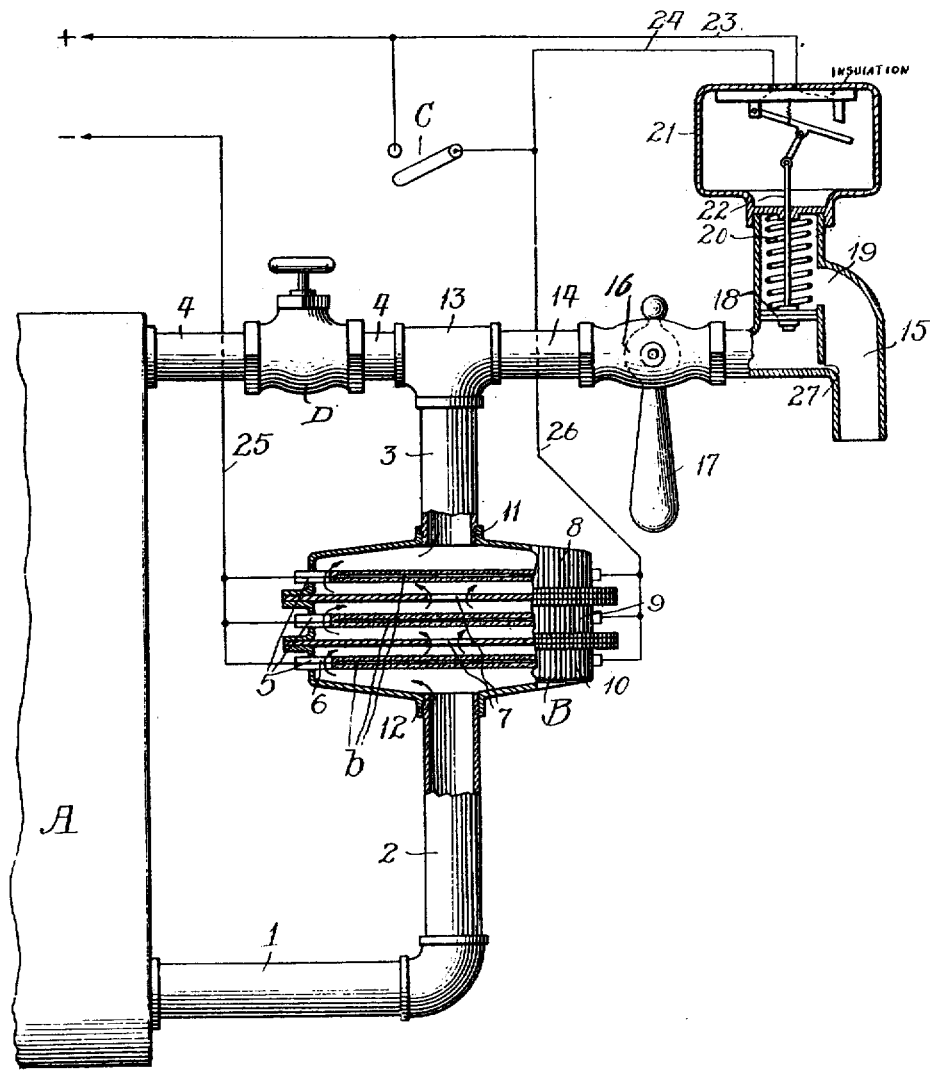

RICHARD S. JACOBSEN, OF CHICAGO, ILLINOIS.

ELECTRIC WATER-HEATER.

1,396,121.  Specification of Letters Patent.  Patented Nov. 8, 1921.

Application filed August 22, 1917. Serial No. 187,512.

*To all whom it may concern:*

Be it known that I, RICHARD S. JACOBSEN, a subject of the King of Norway, and resident of Chicago, Cook county, Illinois, have invented a certain new and useful Improvement in Electric Water-Heaters, of which the following is a specification.

This invention relates to electric water-heaters, but more particularly to those which are adapted to heat running water, so that when a faucet is opened the water will be heated to the required temperature before it escapes.

Generally stated, the object of this invention is to provide a novel and improved electric water-heater of the foregoing general character.

Special objects are to provide an electric heater which will enable the water to absorb practically all of the heat generated by the electric current, thereby to heat the water with as little current as possible; to provide an electric water-heater having an improved arrangement for automatically closing the circuit of the heating device when the faucet is opened; to provide an improved construction and arrangement whereby if the water is not running a hand-switch may be operated to close the circuit through the heating device, and whereby the water thus heated will circulate through a storage tank, so that when necessary a quantity of hot water may be stored for any desired purpose.

It is also an object to provide certain details and features of construction and combinations tending to increase the general efficiency and desirability of an instantaneous electric water-heater of this particular construction.

To these and other useful ends, my invention consists in matters hereinafter set forth and claimed.

In the accompanying drawings, the single figure is a side elevation, more or less in section, and a diagram, showing an electric water-heater embodying the principles of this invention.

As thus illustrated, the invention comprises a tank A for the storage of hot water, of any suitable, known or approved character. The lower portion of the tank is connected with the upper portion thereof by pipes 1, 2, 3 and 4, thereby to provide for the circulation of water in the tank. The pipes 2 and 3 are coupled together by the heating device B, which latter comprises a succession of parallel disks *b* which alternate with the flat metal plates 5, said disks and plates being suitably spaced apart. Said disks have marginal openings 6, while the plates 5 have central openings 7, whereby the heated water is compelled to pass upwardly through the openings 6 and 7 in passing through the heating device. The casing of the heating device B comprises three sections 8, 9 and 10 which are flanged and suitably bolted or otherwise detachably secured together, with one of the disks *b* suitably embodied in each section, whereby the different sections can be secured together with the plates 5 between them to form the complete structure. The section 8 has a boss 11 for the pipe 3, and the section 10 has a boss 12 for the pipe 2, whereby the device B is easily coupled into the pipe-connection between the upper and lower portions of the tank containing the water, said tank being connected with a source of water supply in any suitable or desired manner. It will also be understood that said tank is provided with a connection for drawing off the hot water therefrom. The coupling T 13 between the pipes 3 and 4 has a pipe 14 leading from the other side thereof, and this pipe is coupled to the discharge nozzle 15 by the valve 16, which latter has a handle 17 for the operation thereof, so that a faucet is provided. The nozzle-portion of said faucet has a chamber in which a plunger 18 is mounted to slide up and down, and which is connected by an opening 19 with the nozzle 15, so that when this plunger moves upward it allows the water to pass from the valve 16 and through the opening 19 and then downward from the discharge-nozzle. A spring 20 is provided to yieldingly hold said plunger in its downward position, as shown, so that the water is normally cut off from the discharge-opening 19, but which will permit the plunger to rise under the pressure of the water when the valve is opened. The snap-switch 21 can be of any suitable, known or approved character, and is operated by the plunger-rod 22 in a manner to open and close connection between the two circuit-wires 23 and 24, so that the electric current will be turned on to heat the device B when the plunger 18 rises. The disks *b*, it will be seen, are connected in multiple between the circuit-wires 25 and 26, which latter connects with the wire 24, so that when the circuit is closed the three disks are connected in parallel with each other. A hand-switch C is provided and connected in bridge between the conductors 23 and 24, so that when this switch is closed the circuit through the heating device B will be closed, even though the switch 21 may at such time be open.

The disks b may be of any suitable character, the essential requirement being, of course, that each one contain a resistance or heating unit of suitable character to generate heat when the electric circuit is closed. For this purpose, therefore, each disk may comprise one or more metal coils or heating units embedded or inclosed in a disk of porcelain or enamel of other heat-resisting and non-electrical-conducting substance, and the top and bottom surfaces of each disk may be formed by a thin sheet of metal, so that should the porcelain or enamel crack there will be no leakage of water into contact with the coils or heating units, and no consequent short-circuiting of the electric current into the water-system. It will be understood, though, that the invention is not limited to any particular construction for these disks, as there are various ways in which the coils or other resistance may be protected against contact with the water, and at the same time so arranged that practically all of the heat will be absorbed by the water, without departing from the spirit of the invention.

With the foregoing construction, the operation is as follows: When the switch C is open, no electric current is passed through the heating device B, and no water is being heated. However, when the handle 17 of the faucet is turned, so as to open the valve, the pressure of the water will immediately raise the plunger 18, causing the switch 21 to close the electric circuit, whereby current will pass through the heating device B to heat the running water, which latter passes upward and through the opening 19 and then downward through the discharge-nozzle. In this way, an instantaneous water-heater is provided, which is operated electrically, and which does not consume any current when the faucet is closed. Should it be desired to store a quantity of hot water, the switch C can be closed, so that the circuit through the heating device B will be completed, and in this way the water is heated and circulated through the tank A, in a manner that will be readily understood. The water passes upward from the bottom of the tank through the pipes 1 and 2 and impinges upon the lower disk b, then passes up through the openings 6 and flows between the surfaces of this disk and the adjacent plate 5 until it reaches the central opening 7, and in this way the water flows back and forth between the disks and plates until it escapes upward into the pipe 3, and then flows through the pipe 4 to the top of the tank. When sufficient hot water has been stored in the tank, the switch C can then be opened, thereby discontinuing the operation of the electric heating device.

When the apparatus is in use as an instantaneous water-heater, the pipe 4, of course, should be closed, so that the pressure in the tank A will not force water directly through this pipe to the faucet. In other words, when the device B is to heat running water, the pipe 4 must be closed, whereby water under pressure will flow from the tank through the pipes 1 and 2 and through said device B and pipe 3 to the valve 16, and from the latter through the faucet. For this purpose, therefore, a shut-off valve-device D, of any suitable character, is preferably located in said pipe 4 to control the flow of water through this connection. When it is desired to heat the water by circulation, the shut-off D is opened, but when it is desired to use the device B as an instantaneous heater, then the shut-off D is closed. On the other hand, if the tank A contains hot water, and if for any reason the device B will not sufficiently heat the running water, the shut-off D can be opened before opening the faucet-valve 16, and in such case hot water will be drawn directly from the top of the tank.

From the foregoing, therefore, it will be seen that the invention combines the advantages and essential requirements of both an instantaneous heater and a circulating tank or boiler, so that either method can be employed in heating the water, according to the requirements. It will be understood, of course, that the instantaneous heating of the water, in some cases, may not be sufficient to bring the water up to the required temperature, or that owing to various conditions the water will not heat while running if the faucet is entirely open, so that the instantaneous heating of the water would only be employed for certain purposes. On the other hand, under such conditions, if a much higher temperature is desired for the water, or if a large volume of water is required in as short a time as possible, then the heating of the water previously to fill the tank A will be employed to meet the requirements. Again, it will be seen that by means of the water-circulating-arrangement the tank or water-boiler A can be connected with faucets which are more or less remote from the heater, so that the same heater can be employed to supply hot water to the other faucets in other parts of the house, as well as to the adjacent faucet which forms a part of the instantaneous heating apparatus. A small opening 27 is provided in the faucet, below the opening 19, to take care of leakage, and to prevent accumulation of pressure below the plunger 18 by leakage when the valve is closed. If the valve leaks a little, the opening 27 will permit the leakage to drip from the faucet-nozzle, so that no pressure will be developed below the plunger, and whereby there will be no danger of closure of the switch 21 from causes of this kind.

In practice, of course, the switch C will be placed upon the valve D, in such manner that when the handle of this valve is turned to close the valve the switch will be opened, and so that when the handle is turned to open the valve the switch will be closed, whereby it will not be possible to leave the switch closed while the valve is closed.

With the construction shown and described, it will be seen that the valve handle 17 can be operated to discharge the water without changing the relation between the heater and the tank, inasmuch as the valve D will remain either open or closed, and will not be disturbed. If the valve D is open, the movement of the valve handle 17 to open position will discharge water from the top of the tank, of course, as well as through the heater. When the handle 17 is returned to closed position, the residual quantity of hot water remaining in the heater will ascend to the top of the tank and be stored for use. Also, with the switch C closed, the heater will heat the water and circulate it through the tank, so that the water in the tank can be kept hot. The water, therefore, can either be drawn directly from the top of the tank, or indirectly through the heater, depending upon whether the valve D is open or closed. The direct discharge of the water from the tank is through the connection by which the hot water is fed from the heater to the tank.

What I claim as my invention is:

1. An electric water-heater comprising a hollow body provided with successive heating disks immersed in the water, means to connect said disks with a source of electric current, and connections whereby the water in passing through said device encounters said disks in succession.

2. The structure of claim 1, as stated, said disks having openings therein for the passage of the water through the device.

3. The structure of claim 1, as stated, and one or more baffle-plates interposed between said disks, said disks and plates having openings out of register, so that the water flows back and forth between the disks and plates.

4. An electric water-heater comprising a heating device having means for the passage therethrough of the water, means including an electric switch to connect said device with a source of electric current to heat the water, a valve to control the flow of water through said device, and mechanism located at the discharge or normally dry side of said valve and normally cut off from the water and operated by the water pressure after the opening of the valve to close said switch, said valve when closed cutting off the water from said mechanism, so that normally said mechanism is free from water.

5. The structure of claim 4, as stated, said mechanism comprising a plunger, a spring to yieldingly resist the movement of said plunger by the water-pressure, and a discharge-opening arranged in position to be opened by the movement of said plunger.

6. The structure of claim 4, as stated, and a leakage-opening at the discharge side of said valve to prevent any leakage that may occur in said valve from operating said mechanism.

7. The structure of claim 4, as stated, and instrumentalities including a storage-tank to circulate the water through said device when said valve is closed, and when it is desired to store hot water in said tank.

8. The combination of a hot-water storage-tank and electric heating device, means including a valve to draw running water through said device from the tank, means to control the supply of electric current to said device, and means including a second valve to circulate the water through said device and back to the tank to store hot water therein, while the first valve remains closed, the two valves being operable independently of each other.

9. The structure of claim 8, as stated, said second valve forming a shut-off device to close the circulation-connection between said device and tank when it is desired to use said device as an instantaneous heater to heat running water, and a discharge passage from the top of the tank being formed when both valves are open.

10. An electric water-heater comprising a heating device having means for the passage therethrough of the water, means including an electric switch to connect said device with a source of electric current to heat the water, a valve to control the flow of water through said device, and mechanism normally free from water pressure and operated by said pressure to close said switch when said valve is opened, so that the water pressure must pass said valve before reaching said mechanism, said mechanism comprising a plunger, a spring to yieldingly resist the movement of said plunger by the water-pressure, and a discharge-opening arranged in position to be opened by the movement of said plunger.

11. An electric water-heater comprising a heating device having means for the passage therethrough of the water, means including an electric switch to connect said device with a source of electric current to heat the water, a valve to control the flow of water through said device, mechanism operated by the water-pressure to close said switch, and a leakage-opening at the discharge side of said valve to prevent any leakage that may occur in said valve from operating said mechanism.

12. An electric water-heater comprising a heating device having means for the passage therethrough of the water, means including an electric switch to connect said device with a source of electric current to heat the water, a valve to control the flow of water through said device, mechanism operated by the water-pressure to close said switch, and instrumentalities including a storage-tank to circulate the water through said device when said valve is closed, and when it is desired to store hot water in said tank.

13. In apparatus for heating water, the combination of an electric heater, a plunger subject to displacement by the heated water, a spring normally holding said plunger in position, a valve controlling the flow of hot water to said plunger and means operated by said plunger to control the supply of electric current to said heater.

14. A structure as specified in claim 13, there being a by-pass around the plunger to prevent operation thereof when no water is being drawn off or discharged.

15. In a water heating apparatus, the combination of an electric water heater, a tank, connections to circulate the water from the tank to the heater and back to the tank, thereby to store hot water, a valve interposed between the tank and the outlet of the heater to control the circulation, devices to control the supply of electric current to said heater, and a discharge valve arranged to draw hot water from the tank through the heater or directly through the circulation valve from said tank.

16. A structure as specified in claim 15, said valves when both are open, being operative to cause a discharge of the water through the heater as well as directly from the tank.

17. A structure as specified in claim 15, said circulation valve having a switch to control the passage of the electric current through the heater.

18. A structure as specified in claim 15, said devices including a switch automatically operated by the water when the discharge valve is opened.

19. In a water-heating apparatus, the combination of an electric water heater, a storage tank, connections whereby the water may be drawn off from the tank through the heater, means whereby water from the upper portion of the tank may be drawn off without passing through the heater, adapted when necessary to prevent the water from escaping from the top of the tank, and devices to control the supply of electric current to the heater.

20. A structure as specified in claim 19, said means being adjustable to at times prevent passage of the water from the top of the tank.

Signed by me at Chicago, Illinois, this 12th day of July, 1917.

RICHARD S. JACOBSEN.